(12) United States Patent
Togashi et al.

(10) Patent No.: US 7,239,500 B2
(45) Date of Patent: Jul. 3, 2007

(54) MULTILAYER CAPACITOR

(75) Inventors: Masaaki Togashi, Tokyo (JP); Takashi Aoki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/525,170

(22) Filed: Sep. 22, 2006

(65) Prior Publication Data
US 2007/0076347 A1    Apr. 5, 2007

(30) Foreign Application Priority Data
Sep. 30, 2005    (JP)    ............. P2005-286597

(51) Int. Cl.
*H01G 4/228*    (2006.01)
(52) U.S. Cl. ............... 361/306.3; 361/306.1; 361/321.1; 361/321.2; 361/311; 361/313
(58) Field of Classification Search ............ 361/306.3, 361/306.1, 306.2, 321.1, 321.2, 309, 310, 361/311, 312, 313, 307, 303–305, 301.2, 361/301.3
See application file for complete search history.

(56) References Cited
U.S. PATENT DOCUMENTS 6,288,887 B1*    9/2001    Yoshida et al. .......... 361/306.1
6,549,395 B1*    4/2003    Naito et al. .............. 361/306.1
6,606,237 B1*    8/2003    Naito et al. .............. 361/306.3
6,765,781 B2*    7/2004    Togashi ................... 361/306.3
6,940,708 B2*    9/2005    Yoshii et al. ............... 361/303
7,088,569 B1*    8/2006    Togashi et al. ............. 361/303

FOREIGN PATENT DOCUMENTS

JP    A 6-349666    12/1994

* cited by examiner

*Primary Examiner*—Nguyen T. Ha
(74) *Attorney, Agent, or Firm*—Oliff & Berridge, PLC (57) ABSTRACT

A multilayer capacitor has a multilayer body, and first and second terminal electrodes. In the multilayer body first and second internal electrode are laminated with a dielectric layer in between. The first internal electrode includes first and second electrode portions with a dielectric region between them along the laminating direction of the multilayer body, and a connection portion for electrically connecting the first and second electrode portions. The second internal electrode includes first and second electrode portions with a dielectric region between them along the laminating direction of the multilayer body, and a connection portion for electrically connecting the first and second electrode portions. The first internal electrode is electrically connected to the first terminal electrode, and the second internal electrode to the second terminal electrode.

2 Claims, 10 Drawing Sheets

MULTILAYER CAPACITOR

BACKGROUND OF THE INVENTION

1. Field of the Invention

The present invention relates to a multilayer capacitor.

2. Related Background Art

In recent years there are increasing demands for a multilayer capacitor with small selfloss. The magnitude of selfloss of the multilayer capacitor is represented by quality factor Q (hereinafter simply referred to as Q), and larger Q indicates smaller selfloss of the multilayer capacitor. Q is represented by Eq (1) below.

$$Q=1/(2\pi fCR) \quad (1)$$

In Eq (1), f represents the frequency, C the capacitance of the capacitor, and R the resistance of the capacitor. As seen from Eq (1), it can be understood that the resistance R of the multilayer capacitor is decreased in order to increase Q. Patent Document 1 describes inspection of the multilayer capacitor configured to decrease the resistance by laminating internal electrode pairs each of which is connected to a terminal electrode of an identical pole, instead of laminating internal electrodes layer by layer.

[Patent Document 1] Japanese Patent Application Laid-Open No. 6-349666

SUMMARY OF THE INVENTION

In the multilayer capacitor described in Patent Document 1, however, internal electrodes of two layers constituting each internal electrode pair are electrically connected only through a terminal electrode. For this reason, in the multilayer capacitor described in Patent Document 1, it is difficult to sufficiently decrease the resistance thereof. It is therefore difficult to sufficiently increase Q in the multilayer capacitor described in Patent Document 1.

The present invention has been accomplished in order to solve the above problem and an object of the invention is to provide a multilayer capacitor capable of further increasing the quality factor Q.

In order to achieve the above object, a multilayer capacitor according to the present invention is a multilayer capacitor comprising: a multilayer body in which a first internal electrode and a second internal electrode are laminated with a dielectric layer in between; a first terminal electrode located on a side face of the multilayer body; and a second terminal electrode electrically isolated from the first terminal electrode and located on a side face of the multilayer body, wherein the first internal electrode includes a first electrode portion and a second electrode portion with a dielectric region in between along a laminating direction of the multilayer body, and a connection portion for electrically connecting the first and second electrode portions included in the first internal electrode, and is electrically connected to the first terminal electrode, and wherein the second internal electrode includes a first electrode portion and a second electrode portion with a dielectric region in between along the laminating direction of the multilayer body, and a connection portion for electrically connecting the first and second electrode portions included in the second internal electrode, and is electrically connected to the second terminal electrode.

Each of the first and second internal electrodes of the above-described multilayer capacitor includes the first and second electrode portions with the dielectric region in between. Therefore, the foregoing multilayer capacitor is substantially equivalent to a multilayer capacitor in which internal electrode pairs are laminated, and the resistance thereof can be decreased. Furthermore, in the foregoing multilayer capacitor the first and second electrode portions included in each internal electrode are electrically connected to each other by the connection portion. For this reason, the electric current can flow through various paths in the respective internal electrodes, and the resistance of the capacitor can be decreased. As a result, the quality factor Q can be made larger in the above multilayer capacitor.

Preferably, the first internal electrode further includes a third electrode portion with a dielectric region between the third electrode portion and the second electrode portion included in the first internal electrode along the laminating direction of the multilayer body, and a connection portion for electrically connecting the third electrode portion and the second electrode portion included in the first internal electrode, and the second internal electrode further includes a third electrode portion with a dielectric region between the third electrode portion and the second electrode portion included in the second internal electrode along the laminating direction of the multilayer body, and a connection portion for electrically connecting the third electrode portion and the second electrode portion included in the second internal electrode.

In this case, each of the first and second internal electrodes includes the third electrode portion, and the connection portion for electrically connecting the third electrode portion and the second electrode portion. For this reason, the resistance of the multilayer capacitor can be further decreased and Q of the multilayer capacitor can be made much larger.

The present invention successfully provides the multilayer capacitor capable of further increasing the quality factor Q.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description the same elements or elements with the same functionality will be denoted by the same reference symbols, without redundant description. Hatching is omitted in the accompanying drawings in order to make clear to see.

First Embodiment

Figure 1:
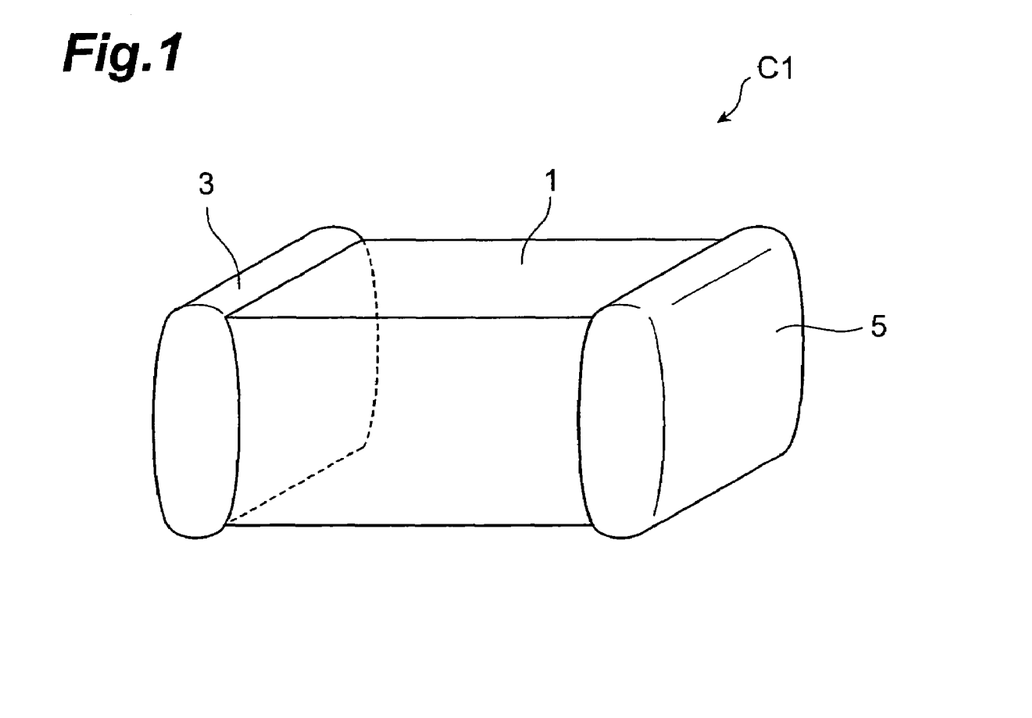
FIG. 1 is a perspective view of a multilayer capacitor according to the first embodiment.
Figure 2:
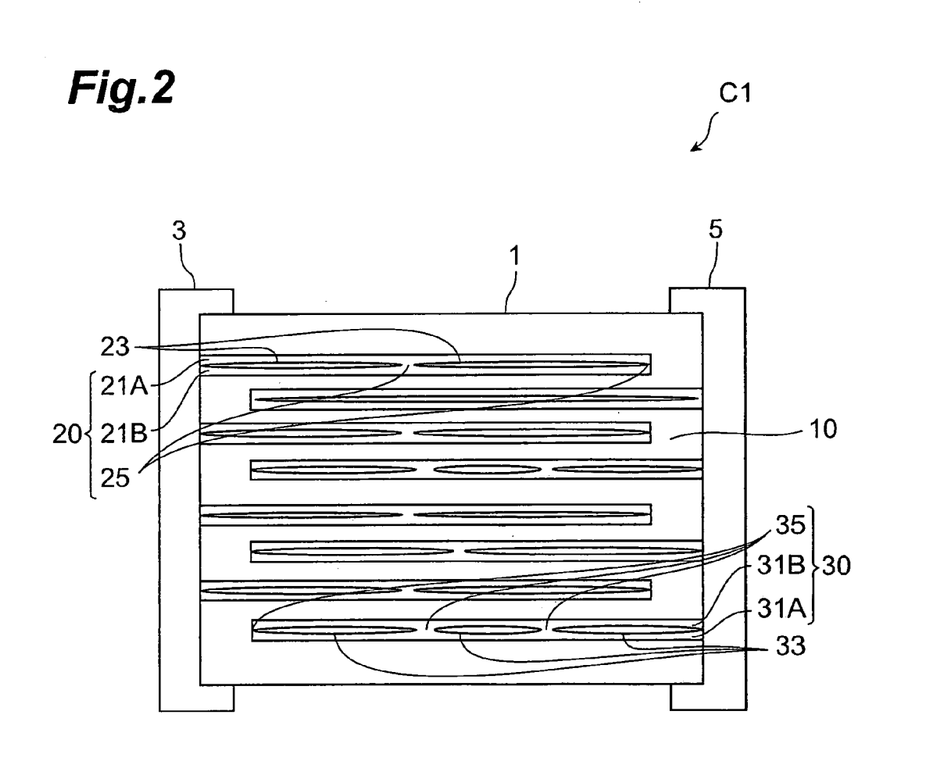
FIG. 2 is a sectional view of the multilayer capacitor according to the first embodiment.

A configuration of a multilayer capacitor C1 according to the first embodiment will be described with reference to FIGS. 1 and 2. FIG. 1 is a perspective view of the multilayer capacitor according to the first embodiment. FIG. 2 is a sectional view of the multilayer capacitor according to the first embodiment.

The multilayer capacitor C1, as shown in FIG. 1, comprises a multilayer body 1 of approximately rectangular parallelepiped shape, and a first terminal electrode 3 and a second terminal electrode 5 formed on the multilayer body 1. The first terminal electrode 3 is formed on a side face extending in the transverse direction of side faces perpendicular to an after-described laminating direction, out of the side faces parallel to the after-described laminating direction of the multilayer body 1. The second terminal electrode 5 is formed on a side face extending in the transverse direction and facing the side face on which the first terminal electrode 3 is formed, out of the side faces parallel to the after-described laminating direction of the multilayer body 1. The first terminal electrode 3 and the second terminal electrode 5 are electrically isolated from each other.

In the multilayer body 1 a plurality of first and second internal electrodes 20, 30 (four layers each in the first embodiment) are laminated with a dielectric layer 10 in between. In practical multilayer capacitor C1, the layers are integrated so that no border can be visually recognized between the dielectric layers 10.

Each of the first internal electrodes 20 is electrically connected to the first terminal electrode 3. Each of the second internal electrodes 30 is electrically connected to the second terminal electrode 5.

Each first internal electrode 20 includes a first electrode portion 21A and a second electrode portion 21B with dielectric region(s) 23 between them along the laminating direction of the multilayer body 1, and one or more connection portions 25 for electrically connecting the first and second electrode portions 21A, 21B. The first electrode portion 21A and second electrode portion 21B included in each first internal electrode 20 are formed so as to overlap each other with the dielectric region 23 in between when viewed along the laminating direction.

The first electrode portion 21A and the second electrode portion 21B included in each first internal electrode 20 are electrically connected to each other through the corresponding connection portions 25. The number of connection portions 25 included in each first internal electrode 20 differs among the first internal electrodes 20. The number of connection portions 25 included in each first internal electrode 20 may be one, or may be two or more. Namely, the first electrode portion 21A and the second electrode portion 21B included in each first internal electrode 20 may be connected at one location, or may be connected at two or more locations.

Each second internal electrode 30 includes a first electrode portion 31A and a second electrode portion 31B with dielectric region(s) 33 between them along the laminating direction of the multilayer body 1, and one or more connection portions 35 for electrically connecting the first and second electrode portions 31A, 31B. The first electrode portion 31A and second electrode portion 31B included in each second internal electrode 30 are formed so as to overlap each other with the dielectric region 33 in between when viewed along the laminating direction.

The first electrode portion 31A and second electrode portion 31B included in each second internal electrode 30 are electrically connected to each other through the connection portions 35. The number of connection portions 35 included in each second internal electrode 30 differs among the second internal electrodes 30. The number of connection portions 35 included in each second internal electrode 30 may be one, or may be two or more. Namely, the first electrode portion 31A and the second electrode portion 31B included in each second internal electrode 30 may be connected at one location, or may be connected at two or more locations.

Figure 3:
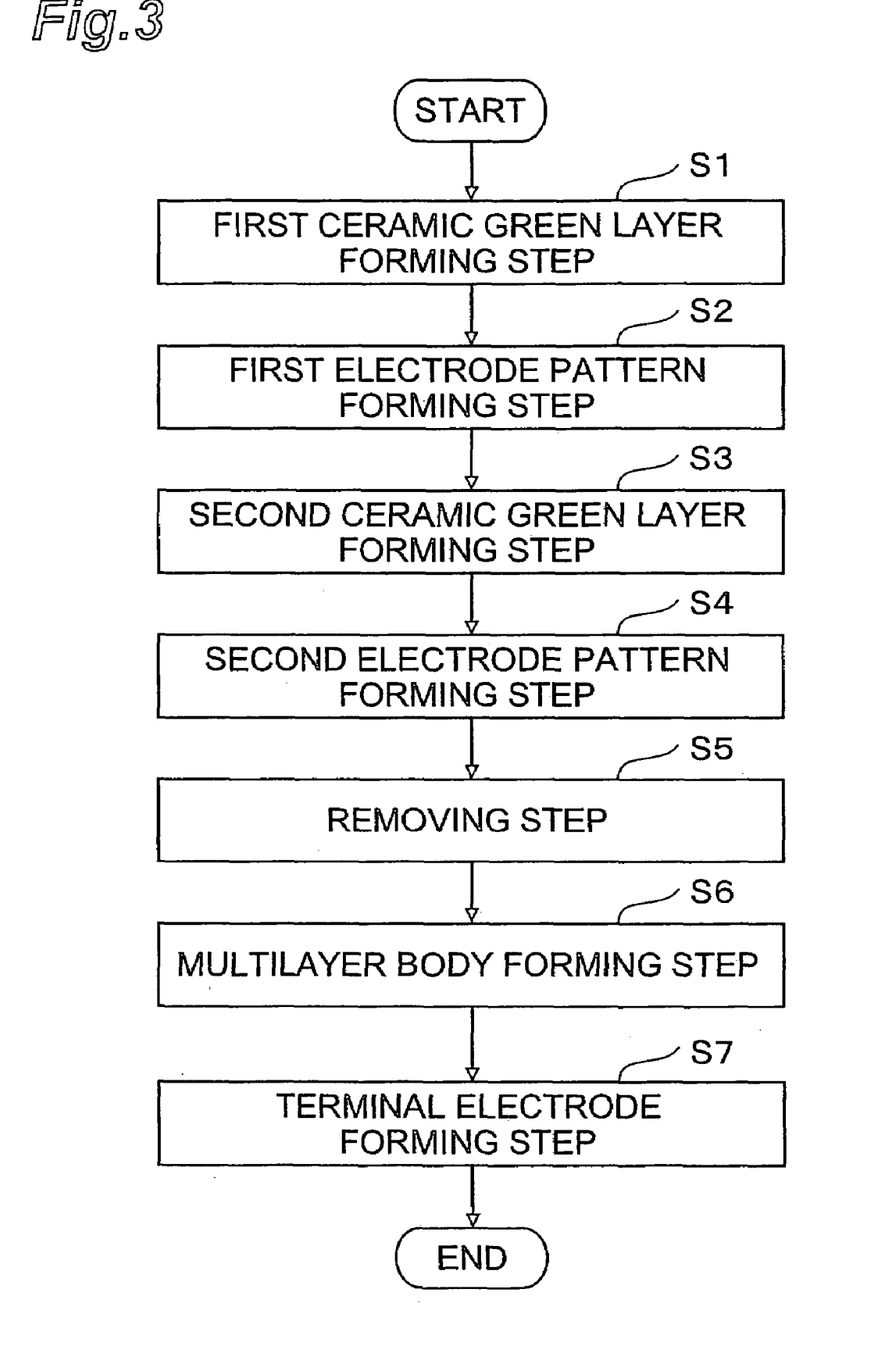
FIG. 3 is a flowchart showing a procedure of a production method of the multilayer capacitor according to the first embodiment.

Next, a production method of the multilayer capacitor C1 according to the first embodiment will be described. FIG. 3 shows a procedure of the production method of the multilayer capacitor C1 according to the first embodiment. As shown in FIG. 3, the production method of the multilayer capacitor C1 according to the first embodiment comprises the following steps: first ceramic green layer forming step S1, first electrode pattern forming step S2, second ceramic green layer forming step S3, second electrode pattern forming step S4, removing step S5, multilayer body forming step S6, and terminal electrode forming step S7.

Figure 4:
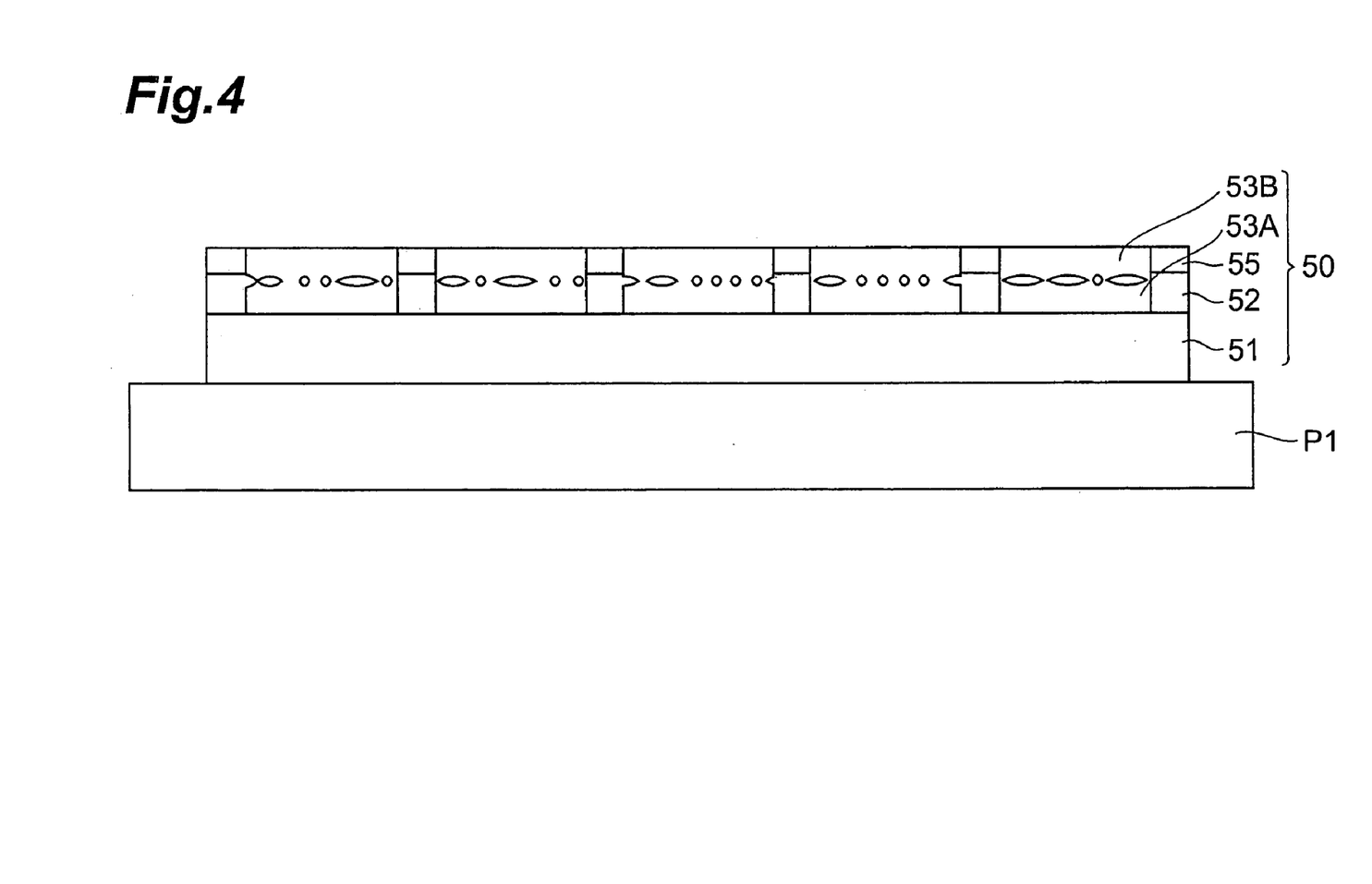
FIG. 4 is a sectional view of a multilayer unit body formed in production steps of the multilayer capacitor according to the first embodiment.

First, the first ceramic green layer forming step S1, first electrode pattern forming step S2, second ceramic green layer forming step S3, second electrode pattern forming step S4, and removing step S5 will be described as steps of forming a multilayer unit body in which one first or second internal electrode layer and one dielectric layer for a plurality of multilayer capacitors are laminated, with reference to FIG. 4. FIG. 4 is a sectional view of multilayer unit body 50 formed in the production steps of the multilayer capacitor C1 according to the first embodiment.

The first ceramic green layer forming step S1 is to form a first ceramic green layer 51 on a PET film P1 (which can be considered as a support). The first ceramic green layer 51 is formed by applying a ceramic slurry, which is obtained by adding a binder resin (e.g., an organic binder resin or the like), a solvent, a plasticizer, etc. into a dielectric material consisting primarily of barium titanate, and mixing and dispersing them, onto the PET film P1, and thereafter drying it.

Next, the first electrode pattern forming step S2 is to form a plurality of first electrode patterns 53A on the top of the first ceramic green layer 51. The first electrode patterns 53A are formed by printing an electrode paste on the top of the first ceramic green layer 51 and then drying it. The electrode paste is, for example, a composition of a paste form in which a binder resin, a solvent, etc. are mixed into metal powder of Ni, Ag, or Pd. Printing means to be used is, for example, screen printing or the like.

Next, the second ceramic green layer forming step S3 is to form a second ceramic green layer 52 on the top of the first ceramic green layer 51 and the first electrode patterns 53A. The second ceramic green layer 52 is formed by applying a ceramic slurry onto the top of the first ceramic green layer 51 and the first electrode patterns 53A and thereafter drying it, as the first ceramic green layer 51 was.

Next, the second electrode pattern forming step S4 is to form a plurality of second electrode patterns 53B at positions where they overlap the first electrode patterns 53A, when viewed along the laminating direction, on the top of the second ceramic green layer 52. The second electrode patterns 53B are formed by printing an electrode paste and thereafter drying it, as the first electrode patterns 53A were.

During the printing of the second electrode patterns 53B in the second electrode pattern forming step S4, the second ceramic green layer 52 dissolves to run because of the solvent contained in the printed electrode paste, whereby the second electrode patterns 53B and the first electrode patterns 53A come to be electrically connected at a plurality of locations. The connection locations between the first electrode patterns 53A and the second electrode patterns 53B formed in this manner correspond to the connection portions 25, 35 included in each internal electrode 20, 30 of the multilayer capacitor C1.

After the second electrode pattern forming step S4, a ceramic paste is printed and dried on marginal regions without the second electrode patterns 53B, on the second ceramic green layer 52, to form an auxiliary layer 55. The ceramic paste for forming the auxiliary layer 55 may consist of the same ingredients as the aforementioned ceramic slurry, or may consist of different ingredients. On this occasion, the thickness of the auxiliary layer 55 is set to the same as the thickness of the second electrode patterns 53B. The auxiliary layer 55 is not always essential.

The above steps complete a multilayer unit body 50 in which the first ceramic green layer 51, the plurality of first electrode patterns 53A, the second ceramic green layer 52, and the plurality of second electrode patterns 53B are formed.

Figure 5:
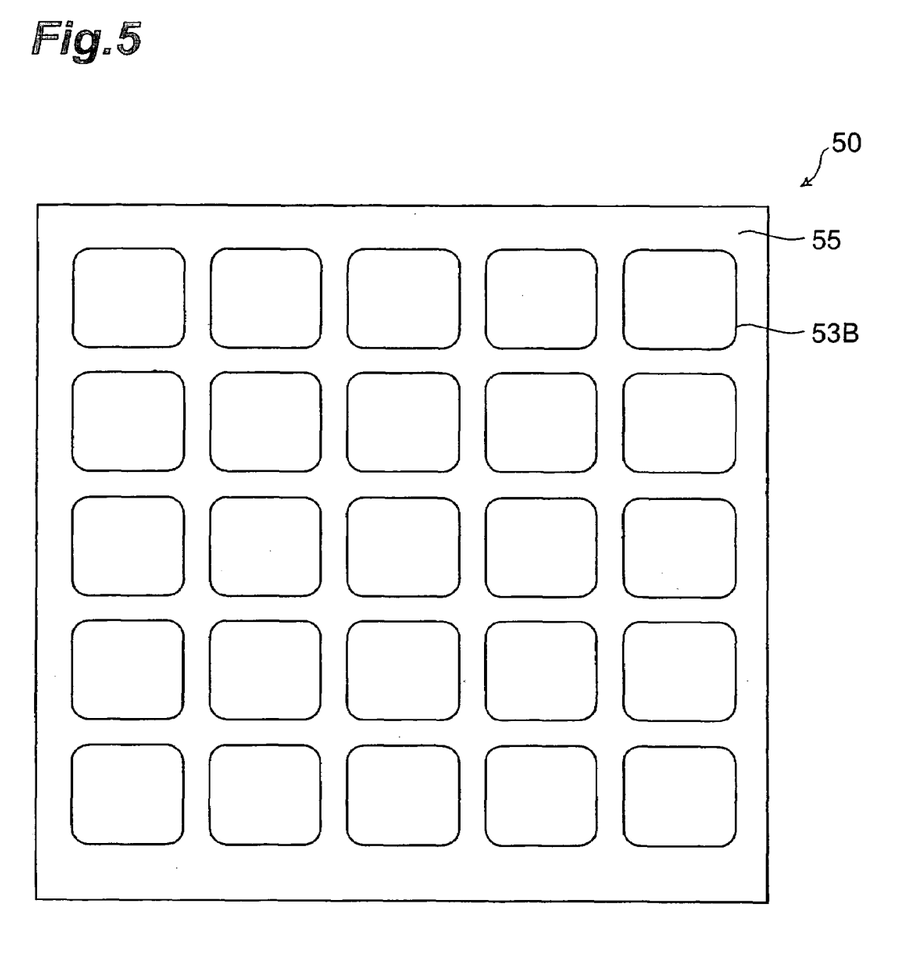
FIG. 5 is a plan view of a multilayer unit body formed in production steps of the multilayer capacitor according to the first embodiment.

Next, the removing step S5 is to remove the PET film P1 from the multilayer unit body 50. FIG. 5 shows the multilayer unit body 50 formed in this manner. FIG. 5 is a plan view of the multilayer unit body 50 formed in the production steps of the multilayer capacitor C1 according to the first embodiment.

As shown in FIG. 5, the first electrode patterns 53A and the second electrode patterns 53B are formed each in approximately rectangular shape and in approximately identical shape. The plurality of first electrode patterns 53A and the plurality of second electrode patterns 53B are formed in a two-dimensional array.

Figure 6:
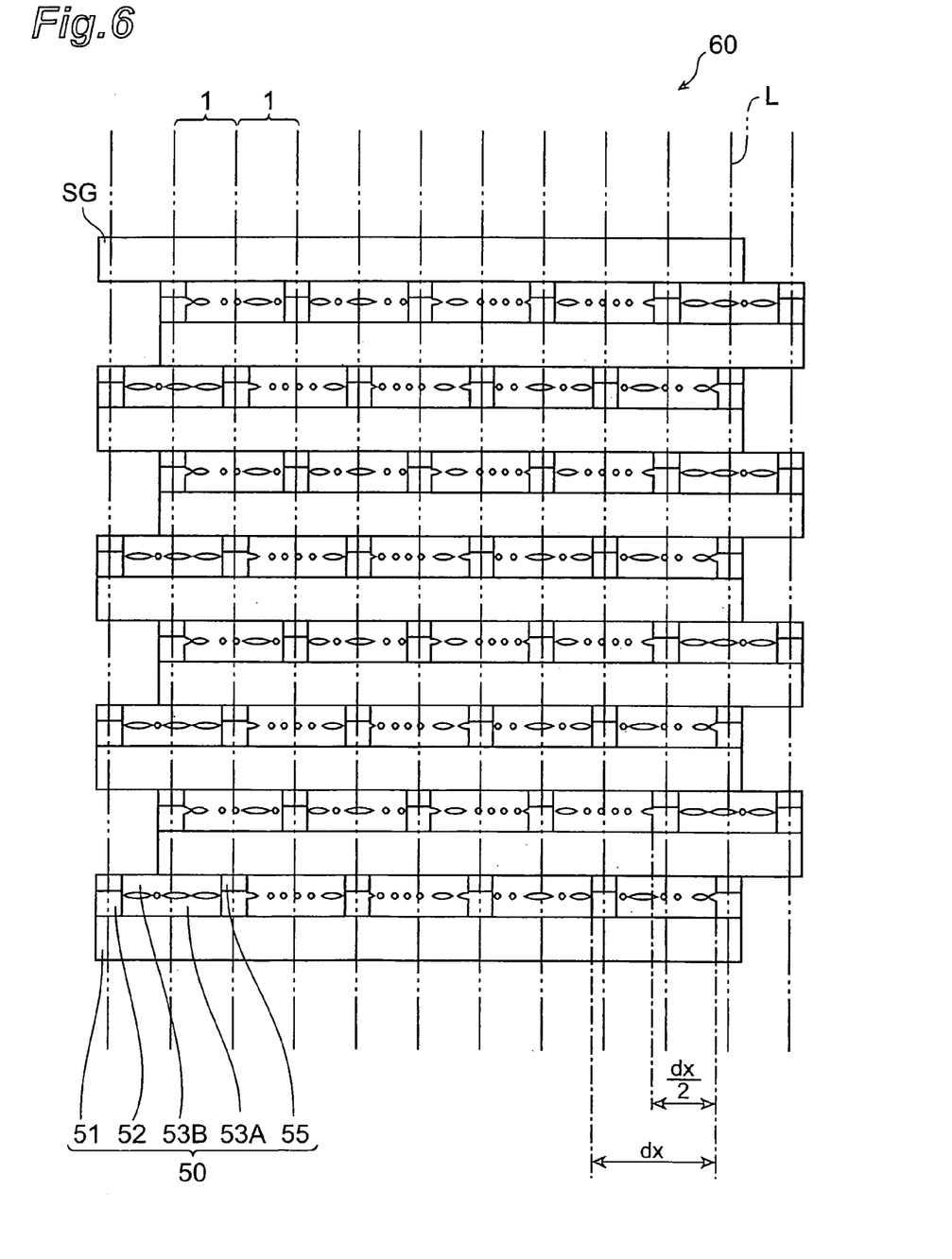
FIG. 6 is a sectional view showing an aggregate formed in production steps of the multilayer capacitor according to the first embodiment.

Subsequently, the multilayer body forming step S6 will be described with reference to FIG. 6. FIG. 6 is a sectional view showing an aggregate 60 formed in the production steps of the multilayer capacitor C1 according to the first embodiment. The multilayer body forming step S6 is to prepare a plurality of multilayer unit bodies 50 (e.g., eight multiplayer unit bodies in the present embodiment), from which the PET film P1 was removed, to laminate the plurality of multilayer unit bodies 50 and a ceramic green layer SG without electrode patterns to form an aggregate 60, and to cut the aggregate 60 to form a plurality of multilayer bodies 1. The aggregate 60 is formed by laminating the ceramic green layer SG and the multilayer unit bodies 50 and pressing them.

The multilayer unit bodies 50 are laminated as displaced by an approximately half pattern for each layer in a direction perpendicular to the laminating direction and parallel to the predetermined array direction of the first and second electrode patterns 53A, 53B. When the forming intervals of the first electrode patterns 53A on the first ceramic green layer 51 are defined as $d_x$, each multilayer unit body 50 is laid as displaced by $d_x/2$.

Subsequently, the aggregate 60 is cut along a first cut planes (not shown) and a second cut planes L perpendicular to each other, to form a plurality of multilayer bodies 1. Each of the first cut planes is a plane located in parallel with the laminating direction and passing midway between the first and second electrode patterns 53A, 53B formed in the array. Each of the second cut planes L is a plane arranged in parallel with the laminating direction and passing through the central regions of the first and second electrode patterns 53A, 53B and midway between the first and second electrode patterns 53A, 53B.

After the cutting, the binder contained in the first ceramic green layer 51, second ceramic green layer 52, and auxiliary layer 55 of the multilayer bodies 1 is removed, followed by baking.

Next, the terminal electrode forming step S7 is to form a first terminal electrode 3 and a second terminal electrode 5 on outer surfaces of each multilayer body 1. The first electrode patterns 53A and the second electrode patterns 53B exposed in the side face of multilayer body 1 after cut in the center by the second cut planes L, are electrically connected through the first terminal electrode 3 or second terminal electrode 5 thus formed.

The first electrode patterns 53A and the second electrode patterns 53B cut in the central region and connected to the first terminal electrode 3 or to the second terminal electrode 5 in this manner correspond to the first and second electrode portions 21A, 21B, respectively, in the first internal electrodes 20 of the aforementioned multilayer capacitor C1, or to the first and second electrode portions 31A, 31B, respectively, in the second internal electrodes 30.

In the second electrode pattern forming step S4, as described above, the second ceramic green layer 52 dissolves to run because of the solvent contained in the electrode paste, whereby the first electrode pattern 53A and the second electrode pattern 53B are electrically connected at a plurality of locations. In consequence, the first electrode portion 21A and the second electrode portion 21B in each first internal electrode 20 of the multilayer capacitor C1 come to be electrically connected through the connection portions 25, and the first electrode portion 31A and the second electrode portion 31B in each second internal electrode 30 come to be electrically connected through the connection portions 35.

The first ceramic green layers 51, second ceramic green layers 52, and auxiliary layers 55 constitute the dielectric layers 10. The steps described above complete the multilayer capacitor C1.

In the multilayer capacitor C1 of the first embodiment each first internal electrode 20 includes the first and second electrode portions 21A, 21B with the dielectric region 23 in between. In the multilayer capacitor C1 each second internal electrode 30 includes the first and second electrode portions 31A, 31B with the dielectric region 33 in between. For this reason, the multilayer capacitor C1 can be said to be a multilayer capacitor in which internal electrodes of substantially two layers, i.e., internal electrode pairs are laminated with a dielectric layer in between. In the multilayer capacitor C1, therefore, it becomes feasible to make the resistance thereof smaller. As a result, the multilayer capacitor C1 can have larger Q, according to Eq (1).

In the multilayer capacitor C1, the first and second electrode portions 21A, 21B included in each first internal electrode 20 are electrically connected through the connection portions 25, and the first and second electrode portions 31A, 31B included in each second internal electrode 30 are electrically connected through the connection portions 35. For this reason, the electric current can flow through various paths in the respective internal electrodes 20, 30. This enables the multilayer capacitor C1 to have a reduced resistance. As a result, the multilayer capacitor C1 can have larger Q, according to Eq (1).

In the production method of the multilayer capacitor C1 according to the first embodiment, the multilayer unit body 50 consisting of the first ceramic green layer 51, first electrode patterns 53A, second ceramic green layer 52, and second electrode patterns 53B is formed on the PET film P1 and thereafter the PET film is removed from the multilayer unit body 50; therefore, the thickness of the multilayer unit body 50 in the removal from the PET film P1 can be set larger than in a case where one ceramic green layer and one electrode pattern layer are laminated on the PET film P1 and where the laminated ceramic green layer and electrode pattern layer are then removed from the PET film P1. Therefore, the multilayer unit bodies 50 with less deformation of the removed surface are laminated, whereby it is feasible to suppress lamination failure of the ceramic green layers in the multilayer capacitor C1.

In the production method of the multilayer capacitor C1 according to the first embodiment, the first layer forming step S1 is arranged to adjust the capacitance of the multilayer capacitor C1 by adjusting the thickness of the first ceramic green layer 51, whereby the thickness of the multilayer unit body 50 in the removal of the PET film P1 can be set to any thickness easy to remove and whereby the capacitance of the multilayer capacitor C1 can be readily adjusted by adjusting the thickness of the first ceramic green layer 51.

Figure 7:
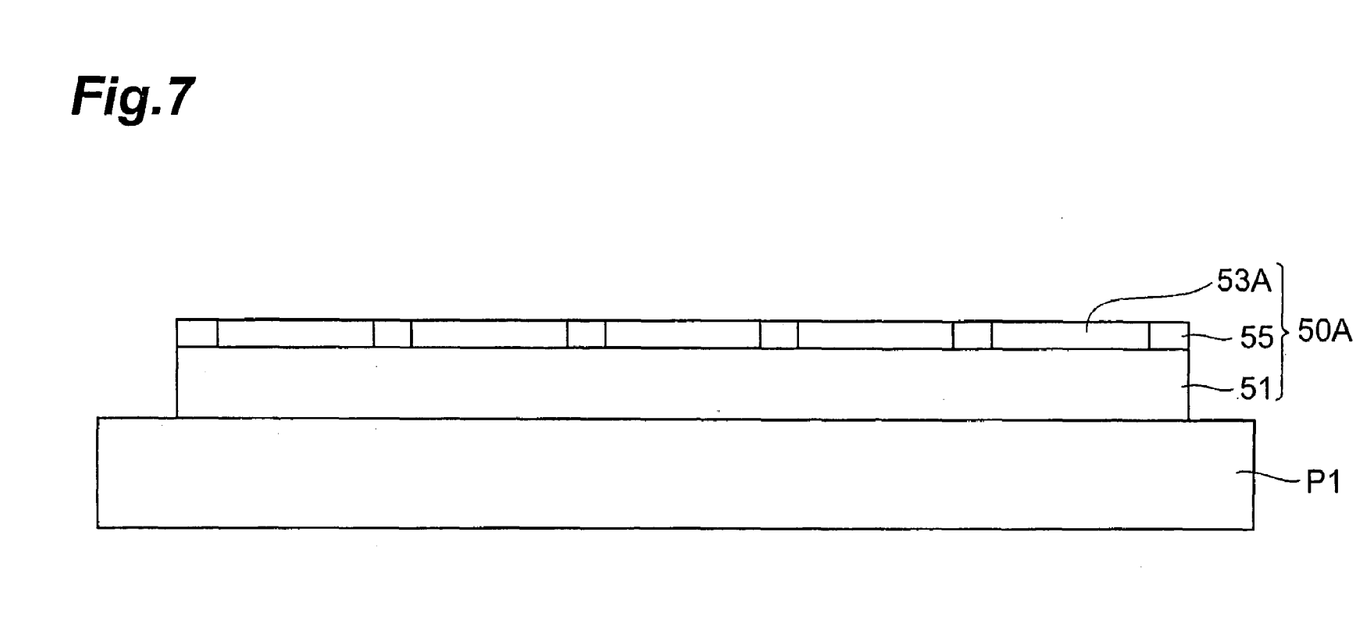
FIG. 7 is a sectional view of multilayer unit body formed in production steps of the multilayer capacitor according to the first embodiment.
Figure 8:
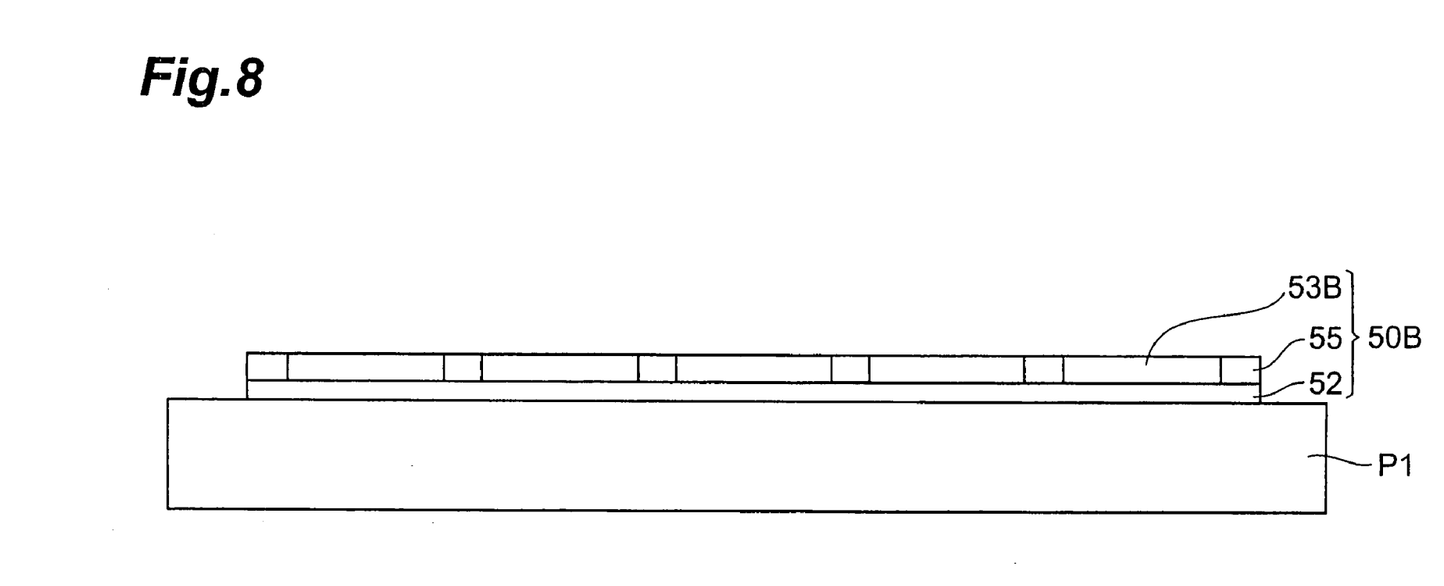
FIG. 8 is a sectional view of multilayer unit body formed in production steps of the multilayer capacitor according to the first embodiment.

The production method of the multilayer capacitor C1 is not limited to the above-described method. The following will describe a modification example of the production method of the multilayer capacitor C1, with focus on differences from the above-described method. The modification example of the production method of the multilayer capacitor C1 is different from the above-described method in that the removing step is carried out after the first electrode pattern forming step S2. FIG. 7 and FIG. 8 respectively show sectional views of multilayer unit bodies formed in the production steps of the modification example of the production method of the multilayer capacitor C1.

FIG. 7 is a sectional view of a multilayer unit body 50A obtained by forming a first ceramic green layer 51 on a PET film P1, forming first electrode patterns 53A thereon, and thereafter printing and drying a ceramic paste on marginal regions without the first electrode patterns 53A on the first ceramic green layer 51, to form an auxiliary layer 55. This forms the multilayer unit body 50A composed of the first ceramic green layer 51, first electrode patterns 53A, and auxiliary layer 55. Thereafter, the PET film P1 is removed from the multilayer unit body 50A.

FIG. 8 is a sectional view of a multilayer unit body 50B obtained by forming a second ceramic green layer 52 on a PET film P1, forming second electrode patterns 53B thereon, and thereafter printing and drying a ceramic paste on marginal regions without the second electrode patterns 53B on the second ceramic green layer 52, to form an auxiliary layer 55. This forms the multilayer unit body 50B composed of the second ceramic green layer 52, second electrode patterns 53B, and auxiliary layer 55. Thereafter, the PET film P1 is removed from the multilayer unit body 50B. The second ceramic green layer 52 is thinner than the first ceramic green layer 51.

Subsequently, the multilayer unit bodies 50A, 50B, from which the PET film P1 was removed, are laminated so that the plurality of first and second electrode patterns 53A, 53B overlap each other when viewed along the laminating direction, thereby forming a multilayer unit body 50. In the printing of the second electrode pattern 53B, the second ceramic green layer 52 dissolves to run because of the solvent contained in the printed electrode paste (which is not shown in FIG. 8). As a result, on the occasion of laminating the multilayer unit bodies 50A, 50B to form the multilayer unit body 50, the second electrode patterns 53B and the first electrode patterns 53A come to be electrically connected at a plurality of locations. The connection locations between the first electrode patterns 53A and the second electrode patterns 53B formed in this manner correspond to the connection portions 25, 35 included in the multilayer capacitor C1.

Figure 9:
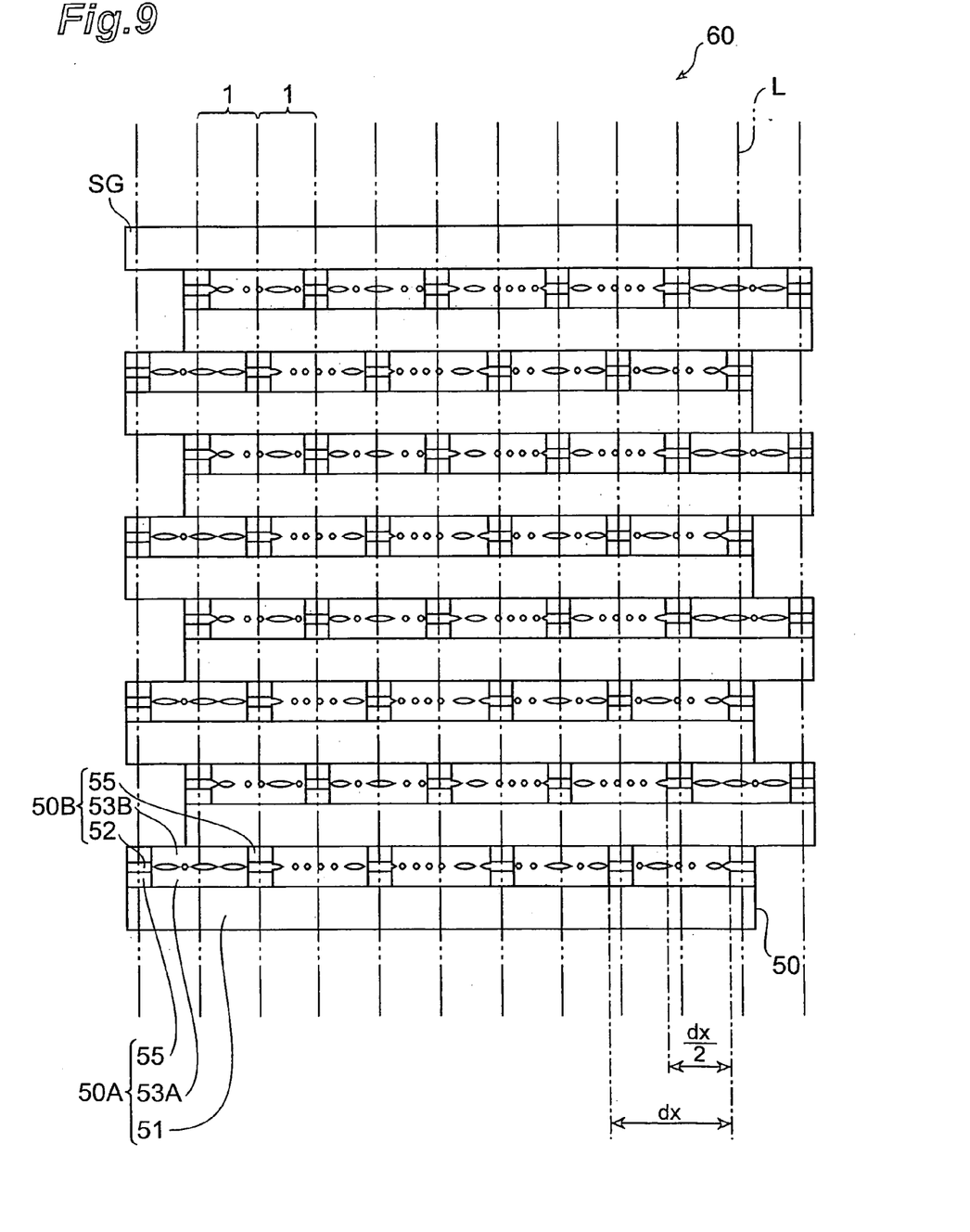
FIG. 9 is a sectional view showing an aggregate formed in production steps of the multilayer capacitor according to the first embodiment.

FIG. 9 is a sectional view showing an aggregate 60 formed in the production steps according to the modification example of the production method of the multilayer capacitor C1 of the first embodiment. As shown in FIG. 9, a plurality of multilayer unit bodies 50 (e.g., eight unit bodies in the present embodiment) are prepared and the plurality of multilayer unit bodies 50 and a ceramic green layer SG without electrode patterns are laminated to form the aggregate 60. Furthermore, the aggregate 60 is cut to form a plurality of multilayer bodies 1.

Second Embodiment

Figure 10:
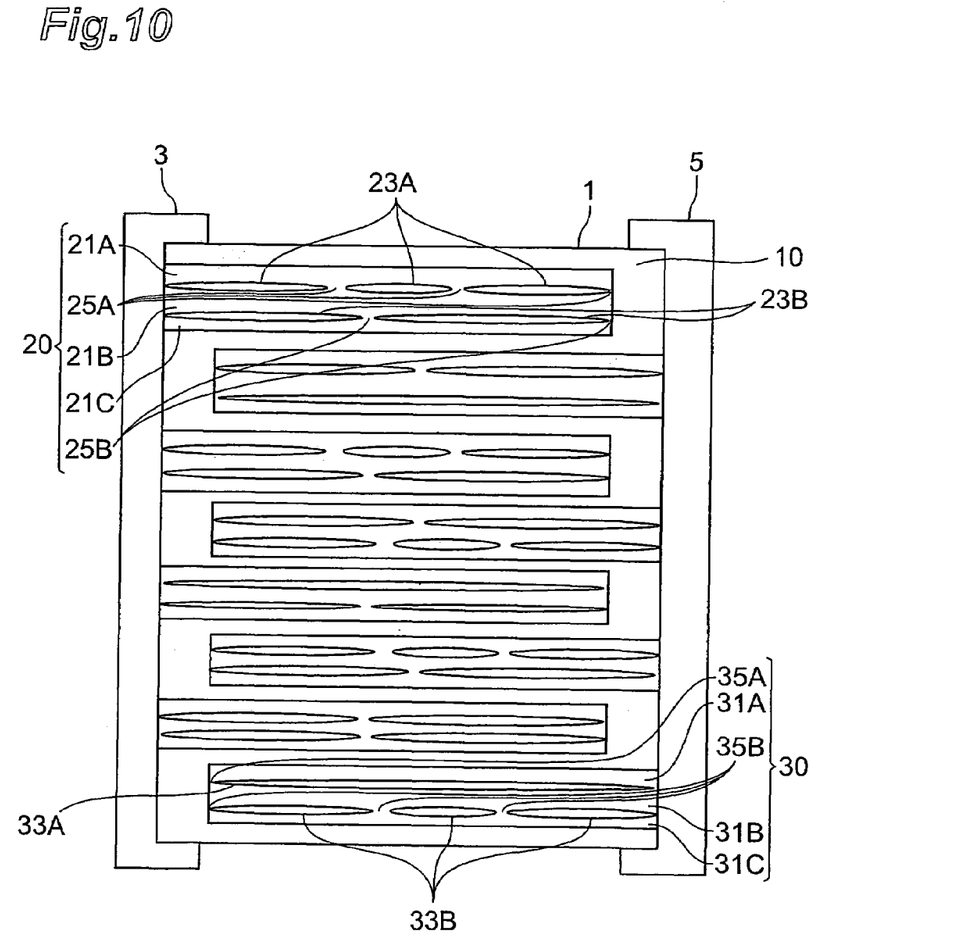
FIG. 10 is a sectional view of a multilayer capacitor according to the second embodiment.

A configuration of a multilayer capacitor C2 according to the second embodiment will be described with reference to FIG. 10. The multilayer capacitor C2 of the second embodiment is different in the number of electrode portions included respectively in the first and second internal electrodes, from the multilayer capacitor C1 of the first embodiment. FIG. 10 is a sectional view of the multilayer capacitor according to the second embodiment.

The multilayer capacitor of the second embodiment, illustration of which is omitted herein, comprises a multilayer body 1, a first terminal electrode 3 formed on the multilayer body 1, and a second terminal electrode 5 formed on the multilayer body 1, as the multilayer capacitor C1 of the first embodiment does.

In the multilayer capacitor C2 of the second embodiment, each first internal electrode 20 includes first to third electrode portions, and connection portions for electrically connecting the first to third electrode portions. Namely, each first internal electrode 20 includes a first electrode portion 21A and a second electrode portion 21B with dielectric region 23A between them along the laminating direction of the multilayer body 1, and one or more connection portions 25A for electrically connecting the first and second electrode portions 21A, 21B. Each first internal electrode 20 further includes a third electrode portion 21C with dielectric region 23B between the third electrode portion 21C and the second electrode portion 21B included in the first internal electrode 20 along the laminating direction of the multilayer body 1, and one or more connection portions 25B for electrically connecting the third electrode portion 21C and the second electrode portion 21B.

The first electrode portion 21A and the second electrode portion 21B included in each first internal electrode 20 are electrically connected to each other through the connection portions 25A. The second electrode portion 21B and the third electrode portion 21C included in each first internal electrode 20 are electrically connected to each other through the connection portions 25B. The number of connection portions 25A included in each first internal electrode 20 may be one, or may be two or more. Also, the number of connection portions 25B included in each first internal electrode 20 may be one, or may be two or more.

In the multilayer capacitor C2 of the second embodiment, each second internal electrode 30 includes first to third electrode portions, and connection portions for electrically connecting the first to third electrode portions. Namely, each second internal electrode 30 includes a first electrode portion 31A and a second electrode portion 31B with dielectric region 33A between them along the laminating direction of the multilayer body 1, and one or more connection portions 35A for electrically connecting the first and second electrode portions 31A, 31B. Each second internal electrode 30 further includes a third electrode portion 31C with dielectric region 33B between the third electrode portion 31C and the second electrode portion 31B included in the second internal electrode 30 along the laminating direction of the multilayer body 1, and one or more connection portions 35B for electrically connecting the third electrode portion 31C and the second electrode portion 31B.

The first electrode portion 31A and the second electrode portion 31B included in each second internal electrode 30 are electrically connected to each other through the connection portions 35A. The second electrode portion 31B and the third electrode portion 31C included in each second internal electrode 30 are electrically connected to each other through the connection portions 35B. The number of connection portions 35A included in each second internal electrode 30 may be one, or may be two or more. The number of connection portions 35B included in each second internal electrode 30 may be one, or may be two or more.

In the multilayer capacitor C2 of the second embodiment each of the first and second internal electrodes 20, 30 includes the first to third electrode portions 21A-21C, 31A-31C with the dielectric region(s) 23A, 23B in between. Accordingly, the multilayer capacitor C2 can be said to be a multilayer capacitor in which internal electrodes of substantially three layers are laminated with the dielectric layer in between. For this reason, in the multilayer capacitor C2, it becomes feasible to decrease the resistance thereof. As a result, the quality factor Q can be increased according to Eq (1).

In each of the first and second internal electrodes 20, 30 of the multilayer capacitor C2, the first to third electrode portions 21A-21C, 31A-31C are electrically connected by the connection portions 25A, 25B, 35A, 35B. This enables the electric current to flow through various paths in the respective internal electrodes 20, 30 in the multilayer capacitor C2. For this reason, in the multilayer capacitor C2, it becomes feasible to decrease the resistance thereof. As a result, the quality factor Q can be increased according to Eq (1).

In the multilayer capacitor C2, each of the first and second internal electrodes 20, 30 includes the three electrode portions 21A-21C, 31A-31C. For this reason, the resistance of the multilayer capacitor can be made much smaller than that of the multilayer capacitor in which each internal electrode 20, 30 includes two electrode portions. As a result, it becomes feasible to further increase Q of multilayer capacitor C2.

In a case where three or more electrode portions included in each internal electrode are not electrically connected in the internal electrode but are connected only through a terminal electrode, the electric current is unlikely to flow through the electrode portions located midway in the laminating direction in the internal electrode, i.e., through the electrode portions not contributing to establishment of capacitance. In contrast to it, the multilayer capacitor C2 is constructed in the configuration wherein the first to third electrode portions 21A-21C, 31A-31C included in each internal electrode 20, 30 are electrically connected through the connection portions 25A, 25B, 35A, 35B in the internal electrode, so that the electric current can also adequately flow through the electrode portions located midway in the laminating direction in the internal electrodes 20, 30, i.e., through the second electrode portions 21B, 21C. For this reason, the multilayer capacitor C2 in which each internal electrode 20, 30 includes the three electrode portions electrically connected to each other in the internal electrode, is effective, particularly, to decrease of resistance. Therefore, the multilayer capacitor C2 is extremely effective in increase of Q.

The preferred embodiments of the present invention were described above in detail, but it is noted that the present invention is by no means intended to be limited to the above embodiments. For example, the number of electrode portions included in the first internal electrode 20 and the number of electrode portions included in the second internal electrode 30 respectively may be three or more. Also, the number of electrode portions in the first internal electrode 20 and the number of electrode portions in the second internal electrode 30 may be different from each other.

For example, the number of laminated dielectric layers 10 and the number of laminated first and second internal electrodes 20, 30 are not limited to the numbers described in the above-described embodiments. The number of terminal electrodes 3, 5 is not limited to the number described in the foregoing embodiments, either. The number of connection portions included in each internal electrode is preferably two or more because the resistance of the multilayer capacitor is decreased more thereby.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
   a multilayer body in which a first internal electrode and a second internal electrode are laminated with a dielectric layer in between;
   a first terminal electrode located on a side face of the multilayer body; and a second terminal electrode electrically isolated from the first terminal electrode and located on a side face of the multilayer body, wherein the first internal electrode includes a first electrode portion and a second electrode portion with a dielectric region in between along a laminating direction of the multilayer body, and a connection portion for electrically connecting the first and second electrode portions included in the first internal electrode, and is electrically connected to the first terminal electrode, and wherein the second internal electrode includes a first electrode portion and a second electrode portion with a dielectric region in between along the laminating direction of the multilayer body, and a connection portion for electrically connecting the first and second electrode portions included in the second internal electrode, and is electrically connected to the second terminal electrode.

2. The multilayer capacitor according to claim 1, wherein the first internal electrode further includes a third electrode portion with a dielectric region between the third electrode portion and the second electrode portion included in the first internal electrode along the laminating direction of the multilayer body, and a connection portion for electrically connecting the third electrode portion and the second electrode portion included in the first internal electrode, and wherein the second internal electrode further includes a third electrode portion with a dielectric region between the third electrode portion and the second electrode portion included in the second internal electrode along the laminating direction of the multilayer body, and a connection portion for electrically connecting the third electrode portion and the second electrode portion included in the second internal electrode.

* * * * *